(12) United States Patent
Sloan

(10) Patent No.: US 8,575,921 B1
(45) Date of Patent: Nov. 5, 2013

(54) POSITION INDICATOR APPARATUS AND METHOD

(76) Inventor: Christopher John Sloan, Pittsburgh, PA (US)

( * ) Notice: Subject to any disclaimer, the term of this patent is extended or adjusted under 35 U.S.C. 154(b) by 963 days.

(21) Appl. No.: 12/558,459

(22) Filed: Sep. 11, 2009

Related U.S. Application Data

(60) Provisional application No. 61/096,766, filed on Sep. 12, 2008.

(51) Int. Cl.
*G01B 7/14* (2006.01)

(52) U.S. Cl.
USPC ...... 324/207.24; 324/228; 324/260; 324/564; 242/563; 92/5 R

(58) Field of Classification Search
USPC ............... 324/207.11–207.15, 207.2–207.26, 324/228, 260, 262, 564; 173/554, 556; 92/5 R; 242/563
See application file for complete search history.

(56) References Cited

U.S. PATENT DOCUMENTS

| | | | |
|---|---|---|---|
| 3,200,214 A | | 8/1965 | Aubert |
| 3,360,007 A | | 12/1967 | Haidek et al. |
| 3,439,706 A | * | 4/1969 | Barrett ........................... 137/554 |
| 4,637,427 A | | 1/1987 | Nolan et al. |
| 6,041,815 A | * | 3/2000 | Nichols ........................ 137/556 |
| 6,729,368 B2 | | 5/2004 | Nguyen |
| 7,331,365 B2 | | 2/2008 | Nguyen |
| 7,461,670 B1 | * | 12/2008 | Roys ............................. 137/554 |
| 7,610,998 B2 | * | 11/2009 | Baumgartner et al. ...... 188/72.9 |
| 7,789,325 B2 | * | 9/2010 | O'Brien ..................... 239/417.3 |

OTHER PUBLICATIONS

CC Technology Pro Flo Lubrication Division, "NeoMag Divider Block Cycle Indicator", <http://www.cct.nu/NeoMag_Brochure_7.04-04.pdf>, Jun. 2004 (last accessed Dec. 31, 2009).

Graco, "TRABON® MSP Modular Divider Valves", <http://wwwd.graco.com/Distributors/DLibrary.nsf/Files/L10102/$file/L10102.pdf>, 2008, p. 4 (last accessed Jan. 4, 2010).

* cited by examiner

*Primary Examiner* — Jermele M Hollington
*Assistant Examiner* — Temilade S Rhodes-Vivour
(74) *Attorney, Agent, or Firm* — Ralph F. Manning; Stephen Ross Green

(57) ABSTRACT

An apparatus for monitoring the movement of a piston disposed within a housing comprises a pin which is responsive to the axial movements of a piston in the housing, the pin having an end which is magnetically coupled to a first ring magnet slidably disposed on a magnet carrier of an indicator body, a second ring magnet disposed on the magnet carrier having its poles oriented so as to repel the first ring magnet, and a retainer for holding the first and second ring magnets on the magnet carrier is described. Additionally, a method for operating the cycle indicator apparatus is also provided. The housing is comprised of one or a plurality of ports through which lubricants are delivered to one or a plurality of corresponding points within a machine.

49 Claims, 3 Drawing Sheets

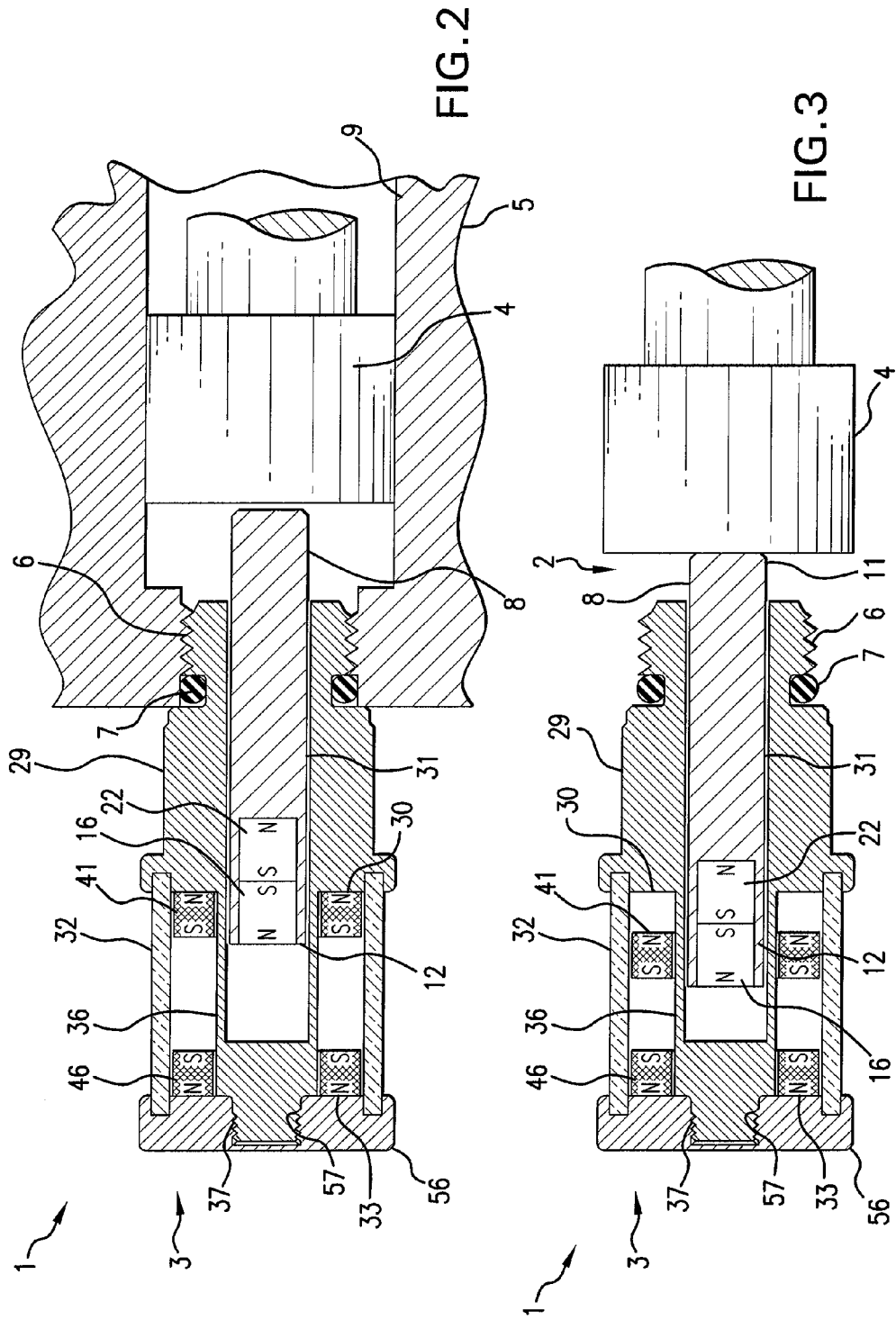

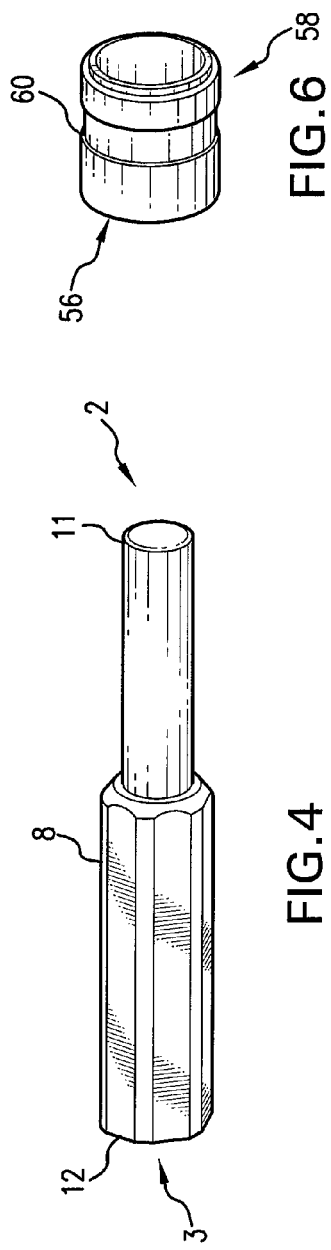
FIG.4
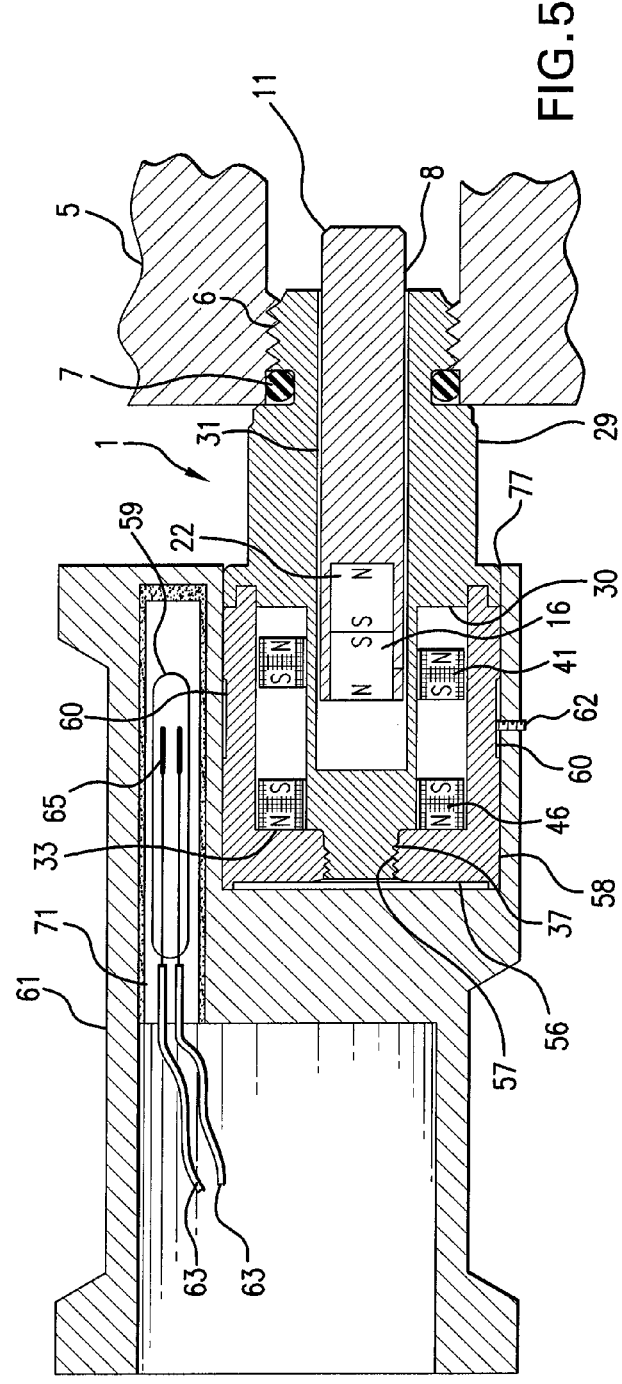
FIG.6
FIG.5

POSITION INDICATOR APPARATUS AND METHOD

CROSS-REFERENCE TO RELATED APPLICATIONS

This application claims the benefit of an earlier-filed U.S. provisional application, entitled "Position Indicator Apparatus and Method" having Ser. No. 61/096,766, filed Sep. 12, 2008.

BRIEF DESCRIPTION OF THE DRAWINGS

FIG. 2 illustrates an example of a partial sectional view of a cycle indicator not responding to the axial movement of a piston.

FIG. 3 illustrates another example of a partial sectional view taken along lines 3-3 in FIG. 1 of a cycle indicator responding to the axial movement of a piston.

FIG. 4 illustrates an alternate example embodiment for a pin for a cycle indicator.

FIG. 5 illustrates another alternate example embodiment showing a reed switch housed within a cycle indicator.

FIG. 6 illustrates an example of a detailed view of an end cap having an extension instead of a separate sleeve.

DETAILED DESCRIPTION

Definitions

Figure 1:
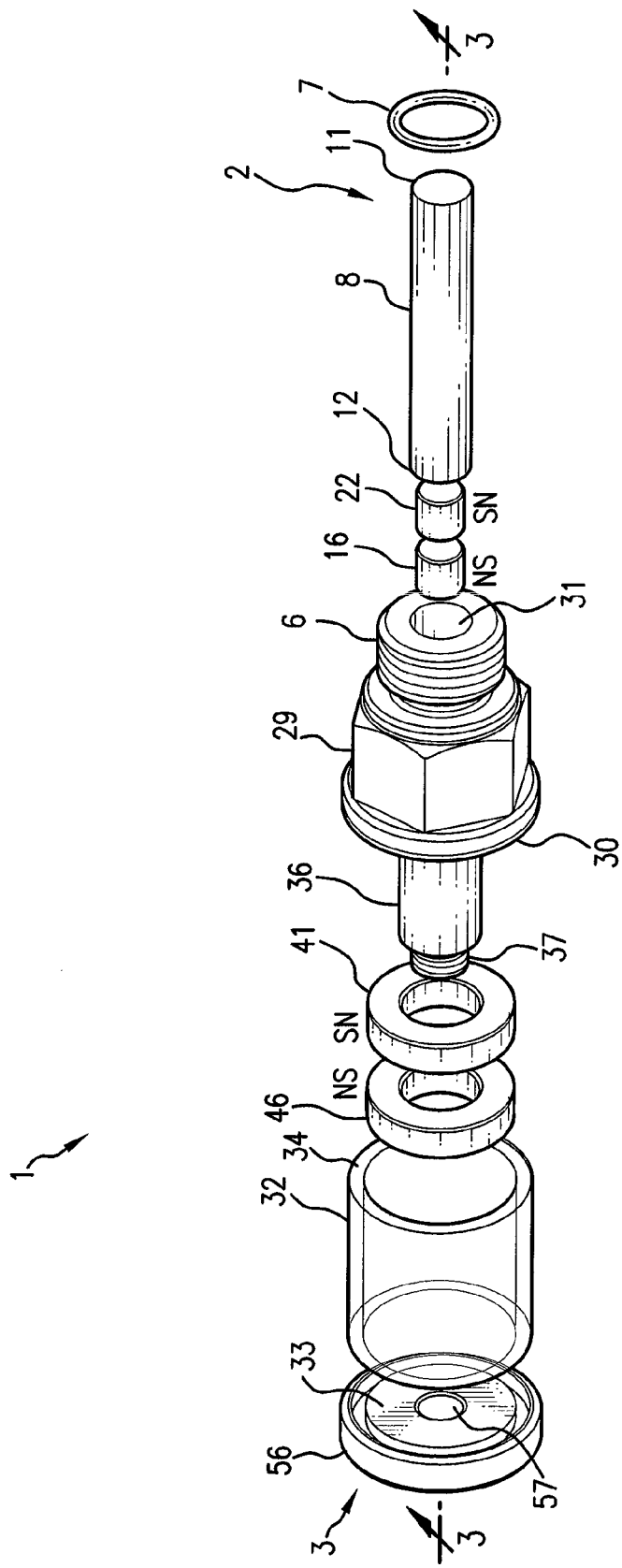
FIG. 1 illustrates an example of an exploded view of a cycle indicator.

A "position indicator" is a device used to monitor the axial movement of a piston by way of a pin and an indicating magnet situated therein. The piston is located within a housing. The position indicator is used to monitor the delivery of lubricants to at least one point in a machine by way of a housing with at least one port which serves as a conduit for delivering the lubricants.

A type of "housing" is a divider block.

An "indicating magnet" means a first ring magnet as described herein.

An "indicator body" includes a magnet carrier and a first ring magnet and a second ring magnet. The magnet carrier carries a first ring magnet, which is also referred to herein as an indicating magnet, and a second ring magnet.

A "proximal end" of a component means an end of a component which is located closer to the housing and piston.

A "distal end" of a component means that the end of a component is located further away from the housing for the position indicator.

A "proximal end" of a component means that a component's end is located closer to the divider block and piston and the distal end means that a component's end is located closer to the housing and piston.

A "pole" means a magnetic pole.

"Like poles" means a north pole-north pole orientation or a south pole-south pole orientation between two magnets.

"Opposing poles" means a north pole-south pole orientation or a south pole-north pole orientation between two magnets.

"Double pole" means like poles between two magnets. The double pole may be a north pole-north pole or a south pole-south pole orientation between two magnets.

"Apparatus" means a position indicator.

"Method" means a method for using a position indicator.

A "cycle indicator" is a type of position indicator.

DESCRIPTION

In a general example embodiment, the position-indicator is an apparatus used to monitor the movement of a piston disposed within a cylinder, said piston and cylinder being disposed within a housing. In a related general example embodiment, a divider block is a type of housing. The piston is disposed within the divider block. The divider block is comprised of at least one port. Lubricants are delivered through the port of a divider block to at least one point within a machine.

In a general example embodiment, the position indicator further comprises a pin with an end which is responsive to the movements of a piston disposed within the housing. A first ring magnet is magnetically coupled to a first pin magnet and a second pin magnet which reside at the other end of the pin. In a related general example embodiment, the first pin magnet and the second pin magnet repel one another and have like poles facing one another.

In another general example embodiment, a double pole is formed by the first pin magnet and the second pin magnet. The double pole is formed since there are like poles facing one another.

In another general example embodiment, the first ring magnet is slidably disposed on a magnet carrier of an indicator body. In a related general example embodiment, a second ring magnet disposed on the magnet carrier. The first ring magnet and the second ring magnet are arranged in a configuration wherein the first ring magnet and second ring magnet repel one another.

As also shown in the example embodiments of FIGS. 1, 2, and 3, first ring magnet (41) and second ring magnet (46) are oriented with respect to each other on magnet carrier (36) such that their respective south poles face each other and their respective north poles point away from one another. First pin magnet (16) and second pin magnet (22) are also oriented with respect to each other so that their south poles are facing one another and their north poles are facing away from one another. As shown in the example embodiment of FIG. 2, the north pole of first pin magnet (16) is attracted to the south pole of first ring magnet (41). A double south pole is formed by the respective south poles of first pin magnet (16) and second pin magnet (22) and such south poles are attracted to the north pole of first ring magnet (41).

As shown in the example embodiment of FIG. 1, cycle indicator (1) has a proximal end (2) in relation to the divider block (not shown) and a distal end (3) which is opposite of proximal end (2). As described herein, the components of cycle indicator (1) is referenced in accordance with proximal end (2) and distal end (3).

As also shown in the example embodiment of FIG. 1, pin (8) of cycle indicator (1) has a circular cross-section and further comprises two small cylindrical pin magnets: a first pin magnet (16) and a second pin magnet (22). As is seen by this example embodiment, first pin magnet (16) and second pin magnet (22) are secured to a second end (12) of pin (8) with their respective south poles facing one another. First pin magnet (16) and second pin magnet (22) are made of a high magnetic strength material. In a related example embodiment, the high magnetic strength material is comprised of at least one rare earth metal. Examples of rare earth metals include, but are not limited to, neodymium. In an alternate example embodiment, the high magnetic strength material is comprised of at least one transition metal. Examples of transition metals include, but are not limited to, iron. In an alternate example embodiment, the high magnetic strength material is comprised of at least one metalloid. Examples of metalloids include, but are not limited to, boron. In yet another alternate example embodiment, the high magnetic strength material is comprised of a combination of rare earth metals, transition metals, and metalloids.

As also shown in the example embodiment of FIG. 2, cycle indicator (1) further comprises an indicator body (29) which is comprised of a first threaded portion (6) so that indicator body (29) is engaged with an internal thread (not shown) of divider block (5) which is located coaxially with piston (4) which is slidably disposed within cylinder (9). In another embodiment, a sealing device such as an o-ring (7) as shown in FIG. 1 is used so as to further secure first threaded portion (6) by engaging with internal threaded portion (not shown) of divider block (5) such that a leak proof seal is formed by engaging with internal threaded portion (not shown) of divider block (5) which is located coaxially with piston (4).

As also shown in the example embodiment of FIG. 2, pin (8) is slidably disposed within indicator body (29) such that pin (8), bore (31), and indicator body (29) are substantially coaxial and concentric. Indicator body (29) further comprises a magnet carrier (36) extending from surface (30). Magnet carrier (36) operates in a direction toward distal end (3) when cycle indicator (1) responds to an axial movement of piston (4) with pin (8) pushed in as shown in the example embodiment of FIG. 3. As shown in the example embodiment of FIG. 3 in conjunction with the example embodiment of FIG. 1, a first end (11) of pin (8) is urged toward a piston (4) in a divider block (5) by the magnetic forces among first ring magnet (41), second ring magnet (46), first pin magnet (16), and second pin magnet (22) as described further herein. The respective magnetic poles of first pin magnet (16) and second pin magnet (22) and first ring magnet (41) and second ring magnet (46) are axial, rather than radial.

As also shown in the example embodiment of FIG. 2, magnet carrier (36) further comprises a threaded portion (37) which is engagable with internal threaded portion (57) of end cap (56). A transparent sleeve (32) encloses magnet carrier (36) and allows a user to view of the movement of first ring magnet (41). Transparent sleeve (32) is generally cylindrical in cross section for enclosing magnet carrier (36) as shown in the example embodiment of FIG. 3. Transparent sleeve (32) is made of a transparent material that provides good visibility for ease of viewing the movement of first ring magnet (41); in a related example embodiment, the transparent material is comprised of clear acrylic. Transparent sleeve (32) is secured between end cap (56) and surface (30) when threaded portion (37) of magnet carrier (36) is engaged with internal threaded portion (57) of end cap (56).

As also shown in the example embodiment of FIG. 2, first ring magnet (41) and second ring magnet (46) are oriented on magnet carrier (36) so as to be coaxial with magnet carrier (36) and pin (8), with second ring magnet (46) which is located at distal end (3) of magnet carrier (36) and abutting an inner face (33) of end cap (56) and with first ring magnet (41) which is located at proximal end (2) of magnet carrier (36) and abutting surface (30). In this position, piston (4) has not yet moved toward first end (11) of pin (8). First ring magnet (41) and second ring magnet (46) are comprised of a high magnetic strength material. In a related example embodiment, the high magnetic strength material is comprised of at least one rare earth metal. Examples of rare earth metals include, but are not limited to, neodymium. In an alternate example embodiment, the high magnetic strength material is comprised of at least one transition metal. Examples of transition metals include, but are not limited to, iron. In an alternate example embodiment, the high magnetic strength material is comprised of at least one metalloid. Examples of metalloids include, but are not limited to, boron. In yet another alternate example embodiment, the high magnetic strength material is comprised of a combination of rare earth metals, transition metals, and metalloids.

In another related example embodiment, first ring magnet (41) is distinctively colored for ease of viewing through transparent sleeve (32).

As also shown in the example embodiments of FIGS. 1, 2, and 3, first ring magnet (41) and second ring magnet (46) are oriented with respect to each other on magnet carrier (36) such that their respective south poles face each other and their respective north poles point away from one another. First pin magnet (16) and second pin magnet (22) are also oriented with respect to each other so that their south poles are facing one another and their north poles are facing away from one another. As shown in the example embodiment of FIG. 2, the north pole of first pin magnet (16) is attracted to the south pole of first ring magnet (41). A double south pole is formed by the respective south poles of first pin magnet (16) and second pin magnet (22) and such south poles are attracted to the north pole of first ring magnet (41).

In an alternate example embodiment, first pin magnet (16) and second pin magnet (22) are also oriented with respect to each other so that their north poles are facing one another and their south poles are facing away from one another. The south pole of first pin magnet (16) is attracted to the north pole of first ring magnet (41). A double north pole is formed by the respective north poles of first pin magnet (16) and second pin magnet (22) and such north poles are attracted to the south pole of first ring magnet (41).

In yet another example embodiment as shown in FIG. 5, a reed switch (59) has contacts (65) that are magnetically responsive to the magnetic field of first ring magnet (41). Reed switch (59) is housed in a first cavity (71) in an enclosure (61) which further comprises a second cavity (77) into which cycle indicator (1) is mounted. In this embodiment, a transparent sleeve (32) (as previously shown in the example embodiment of FIG. 1) is not needed, and instead, end cap (56) is provided with a cylindrical extension (58) which is integrally formed with end cap (56) as shown in the example embodiment of FIG. 6. Cylindrical extension (58) has the same diameter as end cap (56) and the same length as end cap (56) and transparent sleeve (32). Cylindrical extension (58) encloses the first ring magnet (41) and second ring magnet (46). Cylindrical extension (58) has an internal threaded portion (57) which is engagable with threaded portion (37) of magnet carrier (36). In a related example embodiment, end cap (56) and cylindrical extension (58) are formed from a non-magnetic metal. Examples of non-magnetic material include, but are not limited to, stainless steel.

In another example embodiment, cycle indicator (1) is held in place in enclosure (61) by at least one set screw (62) which extends through enclosure (61) such that cycle indicator (1) is removed from enclosure (61) when set screw (62) is loosened. Cylindrical extension (58) has groove (60) which set screw (62) engages when set screw (62) is threaded into enclosure (61).

In all of the example embodiments, cycle indicator (1) is inserted into enclosure (61). Because the length and diameter for each of the above-described example embodiments of cycle indicator (1) are the same, set screw (62) is able to grip a cycle indicator (1) with a transparent sleeve (32) (as shown in the example embodiment of FIG. 1) as long as set screw (62) is tightened.

In another related example embodiment, contacts (65) of reed switch (59) respond to the proximity of the magnetic field from first ring magnet (41) by opening or closing an electrical circuit. In yet another related example embodiment, the circuit controlled by reed switch (59) includes a power supply. In another related example embodiment, the circuit comprises a notification or a shut-off device such as, for example, a lighting emitting diode, an audible alarm, or other suitable device for shutting off the device lubricated by the divider block for protection of the divider block. Such notification or shut-off device is connected to leads (63) of reed switch (59).

In yet another example embodiment, as shown in FIG. 4, pin (8) is comprised of a hexagonal cross section at its distal end (3) and pin (8) has a circular cross section at its proximal end (2). The circular cross section of pin (8) at its proximal end (2) has a smaller diameter than the hexagonal cross section.

Operation

As shown by the example embodiments in FIGS. 2 and 3, because first ring magnet (41) and second ring magnet (46) repel each other, they are disposed along magnet carrier (36) with first ring magnet (41) urged toward surface (30) of indicator body (29) and second ring magnet which is urged toward inner face (33) of end cap (56). Pin (8), upon insertion into bore (31) of indicator body (29), is attracted to and held within the magnetic field of first ring magnet (41) because of the double south pole associated with first pin magnet (16) and second pin magnet (22). Accordingly, pin (8) is held in place and does not fall out due to the magnetic field of first ring magnet (41).

As shown in the example embodiments of FIG. 2 and FIG. 3, respectively, as piston (4) in divider block (5) moves toward cycle indicator (1), it contacts first end (11) of pin (8). As shown in the example embodiment of FIG. 3, as pin (8) is forced further into bore (31) toward end cap (56), first ring magnet (41) slides in that same direction along magnet carrier (36) with pin (8) because of the magnetic coupling between first ring magnet (41) and first pin magnet (16) and second pin magnet (22). As shown in the example embodiments of FIGS. 2 and 3, as first ring magnet (41) follows the movements of pin (8), first ring magnet (41) indicates the position of pin (8) and hence piston (4). The presence of the double south pole, which is created with the south pole of first pin magnet (16) and second pin magnet (22), creates a magnetic field which overcomes the repelling force between first ring magnet (41) and second ring magnet (46). This allows first ring magnet (41) to move toward second ring magnet (46) as pin (8) moves toward distal end (3).

In an example embodiment of a cycle indicator (1) with a reed switch (59), as piston (4) moves toward cycle indicator (1), pin (8), first pin magnet (16) and second pin magnet (22) likewise move in that direction, causing first ring magnet (41) to move along magnet carrier (36) away from surface (30) into proximity with reed switch (59). As that movement of first ring magnet (41) continues, the magnetic field in the vicinity of reed switch (59) is increased, such that contacts (65) of reed switch (59) closes the circuit to which reed switch (59) is connected.

In an example embodiment with reference to the example embodiments of FIG. 3 and FIGS. 2, respectively, at the end of the range of travel for piston (4), piston (4) begins to moves away from cycle indicator (1). Pin (8) moves in that direction as well, due to the attraction of its first pin magnet (16) and second pin magnet (22) to first ring magnet (41) which is repelled by second ring magnet (46). When piston (4) has moved away from cycle indicator (1) as far as it is allowed, first ring magnet (41) and second ring magnet (46) will once again be disposed at opposite ends of magnet carrier (36) because of the mutual repulsion between first ring magnet (41) and second ring magnet (46). First ring magnet (41) is urged against surface (30) and second ring magnet (46) is urged against inner face (33) of end cap (56). At that time, while pin (8) extends partially outwardly from indicator body (29), pin (8) does not move further because first ring magnet (41) is abutting surface (30), pin (8) is held in that position by the attractive force between first ring magnet (41) and first pin magnet (16) and second pin magnet (22).

In an example embodiment which includes reed switch (59), as piston (4) moves away from cycle indicator (1), pin (8) and first pin magnet (16) and second pin magnet (22) also move toward cycle indicator (1), causing first ring magnet (41) to move along magnet carrier (36) toward surface (30) out of proximity with reed switch (59). As that movement of first ring magnet (41) continues, the magnetic field in the vicinity of reed switch (59) decreases, and contacts (65) of reed switch (59) open the circuit to which reed switch (59) is connected.

What is claimed is:

1. An apparatus for monitoring the movement of a piston slidably disposed within in a housing comprising:
   (a) a pin having a first end responsive to movements of said piston in said housing, wherein said pin is disposed within a bore of an indicator body, wherein said pin has a second end which is magnetically coupled to a first ring magnet having a north and a south pole slidably disposed on a magnet carrier of said indicator body, wherein said indicator body further comprises a first threaded portion engagable with an internal thread portion of said housing,
   (b) a second ring magnet having a north and south pole disposed on said magnet carrier for repelling said first ring magnet and,
   (c) a retainer for holding said first ring magnet and said second ring magnet on said magnet carrier comprising:
      (i) an end cap which is secured to said magnet carrier for holding said second ring magnet, and
      (ii) a surface of said indicator body for holding said first ring magnet,
      wherein a transparent sleeve which is securable coaxially with said magnet carrier between said end cap and said surface of said indicator body and wherein said first ring magnet is observable through said transparent sleeve.

2. The apparatus of claim 1 wherein said pin has a first pin magnet and a second pin magnet, wherein each of said first pin magnet and said second pin magnet has north and south poles, wherein each of said first pin magnet and said second pin magnet is secured to said second end of said pin in the same polar orientation as said poles of said first ring magnet and second ring magnet.

3. The apparatus of claim 2 wherein each of said first pin magnet, said second pin magnet, said first ring magnet, and said second ring magnet is made of a high magnetic strength material.

4. The apparatus of claim 3 wherein at least one of said first pin magnet, said second pin magnet, said first ring magnet, and said second ring magnet is comprised of neodymium, iron, boron, or a combination thereof.

5. The apparatus of claim 1 wherein said first ring magnet is distinctively colored for ease of viewing.

6. The apparatus of claim 1 wherein said housing is a divider block.

7. The apparatus of claim 2 wherein said pin further comprises a hexagonal cross section at an end, wherein said end further comprises said first pin magnet and said second pin magnet, and wherein each of said first pin magnet and said second pin magnet has the same polar orientation in respect of each other as that of said first ring magnet and said second ring magnet.

8. The apparatus of claim 1 wherein said magnet carrier further comprises a second threaded portion for engaging an internal threaded portion of said end cap.

9. The apparatus of claim 1 further comprising: an enclosure comprising a second cavity for containing said indicator body and said end cap, wherein a cylindrical extension is integrally formed with said end cap for encasing said first ring magnet and said second ring magnet, wherein said enclosure further comprises a reed switch magnetically responsive to movements of said first ring magnet, and wherein said reed switch is contained in a first cavity of said enclosure.

10. A method for monitoring the movement of a piston disposed within a housing comprising:
   (a) providing a pin having a first end responsive to movements of said piston in said housing, wherein said pin is disposed within a bore of an indicator body, wherein said pin has a second end which is magnetically coupled to a first ring magnet having a north and a south pole slidably disposed on a magnet carrier of said indicator body, wherein said indicator body further comprises a first threaded portion engagable with an internal thread portion of said housing,
   (b) providing a second ring magnet having a north and south pole disposed on said magnet carrier for repelling said first ring magnet, and
   (c) providing a retainer for holding said first ring magnet and said second ring magnet on said magnet carrier comprising;
      (i) an end cap which is secured to said magnet carrier for holding said second ring magnet, and
      (ii) a surface of said indicator body for holding said first ring magnet,
      wherein a transparent sleeve which is securable coaxially with said magnet carrier between said end cap and said surface of said indicator body and wherein said first ring magnet is observable through said transparent sleeve.

11. The method of claim 10 wherein said pin has a first pin magnet and a second pin magnet, wherein each of said first pin magnet and said second pin magnet has north and south poles, wherein each of said first pin magnet and said second pin magnet is secured to said second end of said pin in the same polar orientation as said poles of said first ring magnet and second ring magnet.

12. The method of claim 11 wherein each of said first pin magnet, said second pin magnet, said first ring magnet, and said second ring magnet is made of a high magnetic strength material.

13. The method of claim 12 wherein at least one of said first pin magnet, said second pin magnet, said first ring magnet, and said second ring magnet is comprised of neodymium, iron, boron, or a combination thereof.

14. The method of claim 10 wherein said first ring magnet is distinctively colored for ease of viewing.

15. The method of claim 10 wherein said housing is a divider block.

16. The method of claim 11 wherein said pin further comprises a hexagonal cross section at an end, wherein said end further comprises said first pin magnet and said second pin magnet, and wherein each of said first pin magnet and said second pin magnet has the same polar orientation in respect of each other as that of said first ring magnet and said second ring magnet.

17. The method of claim 10 wherein said magnet carrier further comprises a second threaded portion for engaging an internal threaded portion of said end cap.

18. The method of claim 10 further comprising: providing an enclosure comprising a second cavity for containing said indicator body and said end cap, wherein a cylindrical extension is integrally formed with said end cap for encasing said first ring magnet and said second ring magnet, wherein said enclosure further comprises a reed switch magnetically responsive to movements of said first ring magnet, and wherein said reed switch is contained in a first cavity of said enclosure.

19. An apparatus for monitoring the movement of a piston in a divider block wherein said piston is slidably disposed within said divider block comprising:
   (a) a pin having a first end and a second end, wherein said first end contacts said piston as said pin moves in said divider block, wherein said pin is responsive to movements of said piston in said divider block, wherein said pin has a second end which has first pin magnet and a second pin magnet, wherein each of said first pin magnet and said second pin magnet has respective north and south poles, and wherein said first and second pin magnets are oriented so as to repel one another;
   (b) an indicator body having a magnet carrier, wherein said magnet carrier further comprises a second threaded portion, wherein said indicator body further comprises a first threaded portion engagable with an internal thread portion of said divider block;
   (c) a first ring magnet having a north and south pole slidably disposed on said magnet carrier;
   (d) a second ring magnet having a north and south pole slidably disposed on said magnet carrier having its poles oriented so as to repel said first ring magnet said north and south poles are oriented the same manner as the north and south poles of said first and second pin magnets; and
   (e) a retainer comprising an end cap having internal threads so as to be engagable with said second threaded portion of said magnet carrier with a transparent sleeve securable coaxially with said magnet carrier between said end cap and a surface of said indicator body.

20. The apparatus of claim 19 wherein said pin has a first pin magnet and a second pin magnet, wherein each of said first pin magnet and said second pin magnet has north and south poles, wherein each of said first pin magnet and said second pin magnet is secured to said second end of said pin in the same polar orientation as said poles of said first ring magnet and second ring magnet.

21. The apparatus of claim 19 wherein each of said first pin magnet, said second pin magnet, said first ring magnet, and said second ring magnet is made of a high magnetic strength material.

22. The apparatus of claim 20 wherein at least one of said first pin magnet, said second pin magnet, said first ring magnet, and said second ring magnet is comprised of neodymium, iron, boron, or a combination thereof.

23. The apparatus of claim 19 wherein said first ring magnet is distinctively colored for ease of viewing.

24. The apparatus of claim 19 wherein said pin further comprises a hexagonal cross section at an end, wherein said end further comprises said first pin magnet and said second pin magnet, and wherein each of said first pin magnet and said second pin magnet has the same polar orientation in respect of each other as that of said first ring magnet and said second ring magnet.

25. The apparatus of claim 19 further comprising: an enclosure comprising a second cavity for containing said indicator body and said end cap, wherein a cylindrical extension is integrally formed with said end cap for encasing said first ring magnet and said second ring magnet, wherein said enclosure further comprises a reed switch magnetically responsive to movements of said first ring magnet, and wherein said reed switch is contained in a first cavity of said enclosure.

26. An apparatus for monitoring the movement of a piston slidably disposed within in a housing comprising:
  (a) a pin having a first end responsive to movements of said piston in said housing, wherein said pin is disposed within a bore of an indicator body, wherein said pin has a second end which is magnetically coupled to a first ring magnet having a north and a south pole slidably disposed on a magnet carrier of said indicator body, wherein said indicator body further comprises a first threaded portion engagable with an internal thread portion of said housing,
  (b) a second ring magnet having a north and south pole disposed on said magnet carrier for repelling said first ring magnet,
  (c) a retainer for holding said first ring magnet and said second ring magnet on said magnet carrier comprising:
    (i) an end cap which is secured to said magnet carrier for holding said second ring magnet, and
    (ii) a surface of said indicator body for holding said first ring magnet, and
  (d) an enclosure comprising a second cavity for containing said indicator body and said end cap, wherein a cylindrical extension is integrally formed with said end cap for encasing said first ring magnet and said second ring magnet, wherein said enclosure further comprises a reed switch magnetically responsive to movements of said first ring magnet, and wherein said reed switch is contained in a first cavity of said enclosure.

27. The apparatus of claim 26 wherein said pin has a first pin magnet and a second pin magnet, wherein each of said first pin magnet and said second pin magnet has north and south poles, wherein each of said first pin magnet and said second pin magnet is secured to said second end of said pin in the same polar orientation as said poles of said first ring magnet and second ring magnet.

28. The apparatus of claim 27 wherein each of said first pin magnet, said second pin magnet, said first ring magnet, and said second ring magnet is made of a high magnetic strength material.

29. The apparatus of claim 28 wherein at least one of said first pin magnet, said second pin magnet, said first ring magnet, and said second ring magnet is comprised of neodymium, iron, boron, or a combination thereof.

30. The apparatus of claim 26 wherein said first ring magnet is distinctively colored for ease of viewing.

31. The apparatus of claim 26 wherein said housing is a divider block.

32. The apparatus of claim 27 wherein said pin further comprises a hexagonal cross section at an end, wherein said end further comprises said first pin magnet and said second pin magnet, and wherein each of said first pin magnet and said second pin magnet has the same polar orientation in respect of each other as that of said first ring magnet and said second ring magnet.

33. The apparatus of claim 26 wherein said magnet carrier further comprises a second threaded portion for engaging an internal threaded portion of said end cap.

34. The apparatus of claim 26 wherein a transparent sleeve is securable coaxially with said magnet carrier between said end cap and said surface of said indicator body.

35. A method for monitoring the movement of a piston disposed within a housing comprising:
  (a) providing a pin having a first end responsive to movements of said piston in said housing, wherein said pin is disposed within a bore of an indicator body, wherein said pin has a second end which is magnetically coupled to a first ring magnet having a north and a south pole slidably disposed on a magnet carrier of said indicator body, wherein said indicator body further comprises a first threaded portion engagable with an internal thread portion of said housing,
  (b) providing a second ring magnet having a north and south pole disposed on said magnet carrier for repelling said first ring magnet, and
  (c) providing a retainer for holding said first ring magnet and said second ring magnet on said magnet carrier comprising:
    (i) an end cap which is secured to said magnet carrier for holding said second ring magnet, and
    (ii) a surface of said indicator body for holding said first ring magnet, and
  (d) providing an enclosure comprising a second cavity for containing said indicator body and said end cap, wherein a cylindrical extension is integrally formed with said end cap for encasing said first ring magnet and said second ring magnet, wherein said enclosure further comprises a reed switch magnetically responsive to movements of said first ring magnet, and wherein said reed switch is contained in a first cavity of said enclosure.

36. The method of claim 35 wherein said pin has a first pin magnet and a second pin magnet, wherein each of said first pin magnet and said second pin magnet has north and south poles, and wherein each of said first pin magnet and said second pin magnet is secured to said second end of said pin in the same polar orientation as said poles of said first ring magnet and second ring magnet.

37. The method of claim 36 wherein each of said first pin magnet, said second pin magnet, said first ring magnet, and said second ring magnet is made of a high magnetic strength material.

38. The method of claim 37, wherein at least one of said first pin magnet, said second pin magnet, said first ring magnet, and said second ring magnet is comprised of neodymium, iron, boron, or a combination thereof.

39. The method of claim 35 wherein said first ring magnet is distinctively colored for ease of viewing.

40. The method of claim 35 wherein said housing is a divider block.

41. The method of claim 36 wherein said pin further comprises a hexagonal cross section at an end, wherein said end further comprises said first pin magnet and said second pin magnet, and wherein each of said first pin magnet and said second pin magnet has the same polar orientation in respect of each other as that of said first ring magnet and said second ring magnet.

42. The method of claim 35 wherein said magnet carrier further comprises a second threaded portion for engaging an internal threaded portion of said end cap.

43. The method of claim 35 wherein a transparent sleeve is securable coaxially with said magnet carrier between said end cap and said surface of said indicator body.

44. An apparatus for monitoring the movement of a piston in a divider block wherein said piston is slidably disposed within said divider block comprising:

(a) a pin having a first end and a second end, wherein said first end contacts said piston as said pin moves in said divider block, wherein said pin is responsive to movements of said piston in said divider block, wherein said pin has a second end which has first pin magnet and a second pin magnet, wherein each of said first pin magnet and said second pin magnet has respective north and south poles, and wherein said first and second pin magnets are oriented so as to repel one another;

(b) an indicator body having a magnet carrier, wherein said magnet carrier further comprises a second threaded portion, wherein said indicator body further comprises a first threaded portion engagable with an internal thread portion of said divider block;

(c) a first ring magnet having a north and south pole slidably disposed on said magnet carrier, (d) a second ring magnet having a north and south pole slidably disposed on said magnet carrier having its poles oriented so as to repel said first ring magnet said north and south poles are oriented the same manner as the north and south poles of said first and second pin magnets;

(e) a retainer comprising an end cap having internal threads so as to be engagable with said second threaded portion of said magnet carrier with a transparent sleeve securable coaxially with said magnet carrier between said end cap and a surface of said indicator body; and (f) an enclosure comprising a second cavity for containing said indicator body and said end cap, wherein a cylindrical extension is integrally formed with said end cap for encasing said first ring magnet and said second ring magnet, wherein said enclosure further comprises a reed switch magnetically responsive to movements of said first ring magnet, and wherein said reed switch is contained in a first cavity of said enclosure.

45. The apparatus of claim 44 wherein said pin has a first pin magnet and a second pin magnet, wherein each of said first pin magnet and said second pin magnet has north and south poles, wherein each of said first pin magnet and said second pin magnet is secured to said second end of said pin in the same polar orientation as said poles of said first ring magnet and second ring magnet.

46. The apparatus of claim 45 wherein each of said first pin magnet, said second pin magnet, said first ring magnet, and said second ring magnet is made of a high magnetic strength material.

47. The apparatus of claim 46 wherein at least one of said first pin magnet, said second pin magnet, said first ring magnet, and said second ring magnet is comprised of neodymium, iron, boron, or a combination thereof.

48. The apparatus of claim 44 wherein said first ring magnet is distinctively colored for ease of viewing.

49. The apparatus of claim 45 wherein said pin further comprises a hexagonal cross section at an end, wherein said end further comprises said first pin magnet and said second pin magnet, and wherein each of said first pin magnet and said second pin magnet has the same polar orientation in respect of each other as that of said first ring magnet and said second ring magnet.

* * * * *